US008224940B2

(12) United States Patent
Mukherjee et al.

(10) Patent No.: US 8,224,940 B2
(45) Date of Patent: Jul. 17, 2012

(54) STRATEGIES FOR COMPRESSING INFORMATION USING BLOOM FILTERS

(75) Inventors: Vick B. Mukherjee, Seattle, WA (US); Yikang Xu, Redmond, WA (US); John T. Spivey, Redmond, WA (US); John S. Holmes, III, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 659 days.

(21) Appl. No.: 11/756,542

(22) Filed: May 31, 2007

(65) Prior Publication Data

US 2008/0301218 A1     Dec. 4, 2008

(51) Int. Cl.
*G06F 15/173* (2006.01)
*G06F 21/00* (2006.01)
*G06F 15/16* (2006.01)
*G06F 3/00* (2006.01)
*H04L 12/56* (2006.01)

(52) U.S. Cl. .......... 709/223; 705/51; 370/392; 709/247; 715/716

(58) Field of Classification Search .................. 709/223
See application file for complete search history.

(56) References Cited

U.S. PATENT DOCUMENTS

| | | | |
|---|---|---|---|
| 6,920,477 | B2 | 7/2005 | Mitzenmacher |
| 7,526,451 | B2 * | 4/2009 | Park et al. .................. 705/51 |
| 2005/0022009 | A1 | 1/2005 | Aguilera et al. |
| 2005/0086376 | A1 | 4/2005 | Park et al. |
| 2005/0086520 | A1 | 4/2005 | Dharmapurikar et al. |
| 2005/0108368 | A1 | 5/2005 | Mohan et al. |
| 2005/0195832 | A1 | 9/2005 | Dharmapurikar et al. |
| 2005/0219929 | A1 | 10/2005 | Navas |
| 2006/0072582 | A1 | 4/2006 | Bronnimann et al. |
| 2006/0268876 | A1 * | 11/2006 | Grah .............................. 370/392 |
| 2007/0083675 | A1 * | 4/2007 | Vemulapelli et al. .......... 709/246 |
| 2008/0270628 | A1 * | 10/2008 | Nekovee et al. ............... 709/247 |
| 2009/0019367 | A1 * | 1/2009 | Cavagnari et al. ............. 715/716 |

OTHER PUBLICATIONS

Broder, et al., "Network Applications of Bloom Filters: A Survey," Allerton Conference, 2002, 11 pages.
Chazelle, et al., "The Bloomier Filter: An Efficient Data Structure for Static Support Lookup Tables," Proceedings of the Fifteenth Annual ACM-SIAM Symposium on Discrete Algorithms, 2004, pp. 30-39.
Dillinger, et al., "Bloom filters in Probabilistic Verification," FMCAD 2004, Formal Methods in Computer-Aided Design, 15 pages.
Mitzenmacher, "Compressed Bloom Filters," IEEE/ACM Transactions on Networking, vol. 10, No. 5, 2002, pp. 604-612.
Shanmugasundaram, et al., "Payload Attribution via Hierarchical Bloom Filters," Proceedings of the 11th ACM Conference on Computer and Communications Security, 2004, pp. 31-41.
Pagh, et al., "An Optimal Bloom Filter Replacement," Proceedings of the Sixteenth Annual ACM-SIAM Symposium on Discrete Algorithms, 2005, pp. 823-829.

* cited by examiner

*Primary Examiner* — Phuoc Nguyen
*Assistant Examiner* — Kishin G Belani
(74) *Attorney, Agent, or Firm* — Lee & Hayes, PLLC (57) ABSTRACT

A strategy is described for constructing bloom filter information and exception information. The bloom filter information is constructed to express a set of items in a lossy compressed form. The exception information reveals occasions in which the bloom filter information erroneously indicates that a candidate item is a member of the set. The strategy can apply the bloom filter information and the exception information to select a representative device among a group of devices on which a user may maintain simultaneous presence.

14 Claims, 10 Drawing Sheets

PRESENCE SERVER PROCESSING

MPOP-AWARE DEVICE PROCESSING AND PRESENCE SERVER PROCESSING

FIG. 11 ions in the course of its lifecycle. Each revision may add new features. Alternatively, or in addition, a new version may omit features that were used in a previous version of the service. In one technique, an administrator of the service may require that each user of the service upgrade to the current version of the service. In another technique, an administrator may allow users to continue to use a previous version of the service, even though an updated version of the service is available. In the latter technique, a first group of users can be expected to use the new version of the service while a second group of users can be expected to use one or more prior versions of the service.

STRATEGIES FOR COMPRESSING INFORMATION USING BLOOM FILTERS

BACKGROUND

A network-accessible service may undergo a series of revisions in the course of its lifecycle. Each revision may add new features. Alternatively, or in addition, a new version may omit features that were used in a previous version of the service. In one technique, an administrator of the service may require that each user of the service upgrade to the current version of the service. In another technique, an administrator may allow users to continue to use a previous version of the service, even though an updated version of the service is available. In the latter technique, a first group of users can be expected to use the new version of the service while a second group of users can be expected to use one or more prior versions of the service.

A service that allows users to interact with different versions of the service faces various challenges. For example, it may be appropriate to maintain records which identify the versions that various users are using. It may also be appropriate to maintain records which set forth the way in which users who are using different versions are enabled to interact with each other. This record-keeping operation can be an unwieldy task in a service that accommodates a large number of users and/or a service that permits complex interaction among users. For instance, a server-side store which retains the above-described information may become relatively large, making it difficult to maintain and use.

SUMMARY

A strategy is described for constructing bloom filter information and exception information. The bloom filter information is constructed to express a set of items in compressed form. Being a lossy form of compression, the bloom filter information may erroneously indicate that a candidate is a member of the set, when, in fact, the candidate is not actually a member of the set. The exception information reveals occasions in which the bloom filter information erroneously indicates that a candidate item is a member of the set.

The strategy can apply the bloom filter information and exception information in a system that includes a first group of multiple-point-of-presence-aware (MPOP-aware) devices and a second group of non-MPOP devices. MPOP-aware devices permit a user to maintain a simultaneous presence on two or more of the MPOP-aware devices. Non-MPOP devices do not permit a user to maintain such simultaneous presence; that is, a user can maintain only a single presence on one of the non-MPOP devices at any given time. The strategy can use the bloom filter information and exception information to select a representative MPOP-aware device for one or more members of the first group of MPOP-aware devices. A non-MPOP device can share content with the one or more members of the MPOP-aware devices using the representative device.

Additional exemplary implementations features are described in the following.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a strategy for compressing a set of items using bloom filter information and exception information. This disclosure also describes a strategy for applying the bloom filter information and exception information to coordinate interaction between a first group of multiple-point-of-presence-aware (MPOP-aware) devices and non-MPOP devices. The strategy can be manifested in various systems, apparatuses, modules, procedures, storage mediums, data structures, and other forms.

As a preliminary note, any of the functions described with reference to the figures can be implemented using software, firmware, hardware (e.g., fixed logic circuitry), manual processing, or a combination of these implementations. The term "logic, "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.).

Certain features are described flow chart form. In this mode explanation, certain operations are described as constituting distinct blocks performed in a certain order. Such implementations are exemplary and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

A. Functionality for Determining Bloom Filter Information and Exception Information.

Figure 1:
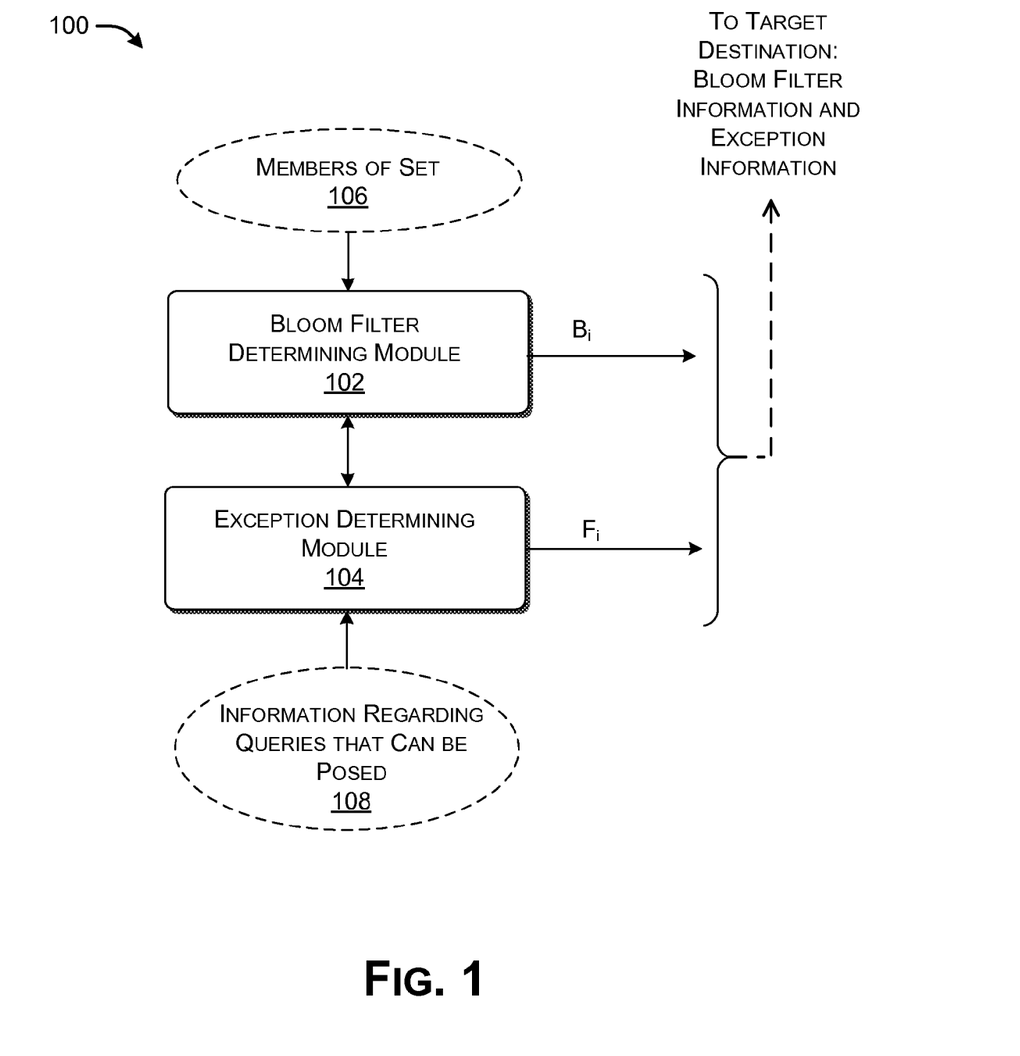
FIG. 1 shows exemplary information-determining functionality for determining bloom filter information and exception information.

FIG. 1 shows information-determining functionality 100 for calculating bloom filter information. The bloom filter information corresponds to information provided by a bloom filter. A bloom filter represents a set S of n items $\{x_1, \ldots, x_n\}$ by an array of m bits using k independent hash functions $h_1, \ldots, h_k$ with range $\{1, \ldots, m\}$. Expressing the set S in the form of a bloom filter is desirable because it is a highly compressed way of representing the members of the set S. After being formed, a lookup procedure can be used to probabilistically determine whether a candidate item $x_c$ is a member of the set of items S. The lookup operation can be expressed by the function LOOKUP(B, $x_c$), where this operation determines whether the candidate item $x_c$ exists in the bloom filter B.

A lookup operation can yield a negative answer (i.e., indicating that $x_c$ is not a member of the set S) or a positive answer (i.e., indicating that $x_c$ is a member of the set S). A negative answer will always be correct, but there is some probability that a positive answer will not be correct. More specifically, the minimal rate f of receiving a false answer can be expressed as:

$$f = (0.5)^k = (0.6185)^{\frac{m}{n}},$$

where the terms k, m, and n are defined above. The number of independent hash functions k minimizes f when:

$$k = \ln 2 \cdot \left(\frac{m}{n}\right).$$

Note, for instance, A. Broder and M. Mitzenmacher, *Network Applications of Bloom Filters: A Survey, Proceedings of the 40th Annual Allerton Conference on Communication, Control, and Computing,* 2002, pp. 636-646. Based on these equations, it is possible to control the rate of false positives f by adjusting one or more of the above-identified factors that influence this parameter.

The information-determining functionality 100 of FIG. 1 provides a way of enhancing bloom filter information with exception information. More specifically, the functionality 100 includes a bloom filter determination module 102 and an exception determining module 104. The bloom filter determination module 102 computes bloom filter information, while the exception determination module 104 computes exception information. The exception information identifies whether a positive result returned by a bloom filter lookup operation is a false positive.

More specifically, the purpose of the bloom filter determining module 102 is to compute bloom filter information $B_i$ for an entity i using conventional techniques. The bloom filter information $B_i$ expresses the members of a set of items 106 in compressed form. The members of the set can represent to any features. For example, as will be described in Section B, a device i can compute bloom filter information $B_i$ to represent other devices $\{id_1, \ldots, id_1\}$ with which it has a content-sharing relationship, where the devices are represented by respective identification numbers or codes $id_1, \ldots id_n$.

The purpose of the exception determination module 104 is to compute exception information $F_i$, associated with the bloom filter information $B_i$. As described above, the bloom filter information $B_i$ has the potential of returning false positives, but not false negatives. The exception information $F_i$, identifies the positive results generated by the bloom filter information $B_i$ that are incorrect, i.e., which are false positives. The exception determination module 104 computes the exception information $F_i$, by identifying a set of queries 108 that can be presented to the bloom filter information $B_i$. Each query asks the bloom filter determining module 102 whether a particular candidate member $x_c$, is a member of the set of items S. If the bloom filter information $B_i$ indicates that candidate item $x_c$ is a member of the set, the exception determination module 104 next determines whether the candidate item is indeed actually a member of the set S. Two assumptions underlie the operation of the exception determining module 104. The first assumption is that it is possible to identify a bounded set of known queries 108 that can be posed to the bloom filter determining module 102. The second assumption is that information exists as a reference to determine the actual members of the set. Section B will set forth one example of a system in which the above two assumptions hold true.

Figure 2:
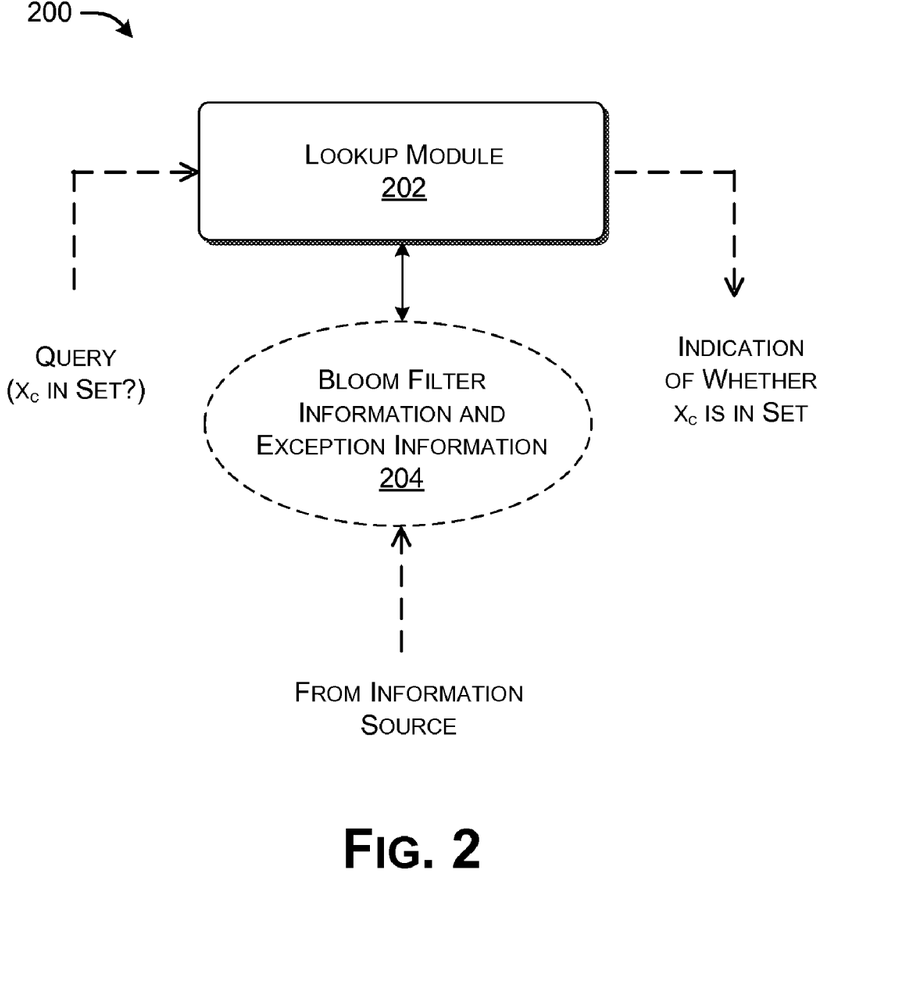
FIG. 2 shows exemplary lookup functionality for using the bloom filter information and exception information (determined using the functionality of FIG. 1) to determine whether a candidate item is a member of a set of items.

FIG. 2 shows lookup functionality 200. The lookup functionality 200 applies the bloom filter information $B_i$ and the exception information $F_i$ computed by the information-determining functionality 100 of FIG. 1. The lookup functionality 200 includes a lookup module 202. The lookup module 202 implements a function ENHANCED_LOOKUP($B_i$, $x_c$). This function first consults the bloom filter information $B_i$ 204 to determine whether the bloom filter information $B_i$ indicates that a candidate item $x_c$ is a member of the set of items S represented by the bloom filter information $B_i$. For a positive answer by the bloom filter information $B_i$, the lookup module 202 then consults the exception information $F_i$ 204 to determine whether $x_c$ is indeed a member of the set S.

Figure 3:
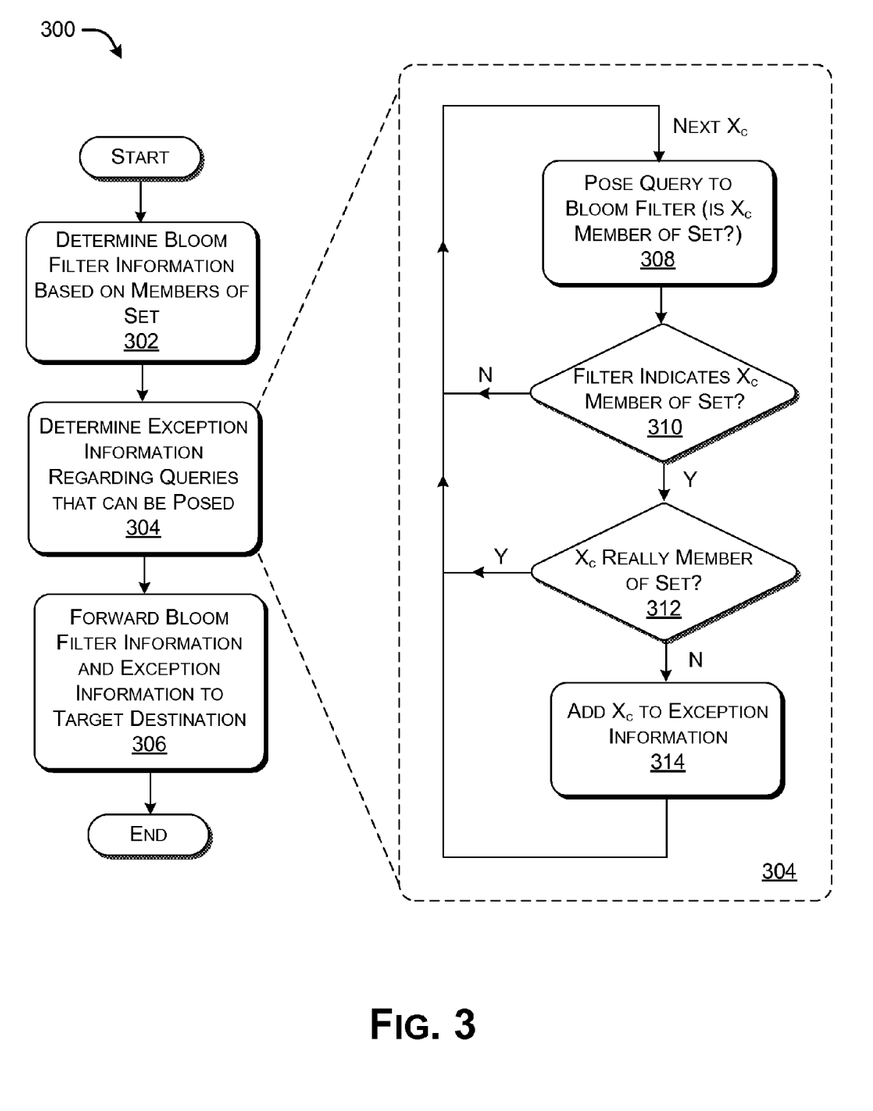
FIG. 3 is a flowchart which illustrates one manner of operation of the information-determining functionality of FIG. 1.

FIG. 3 shows a procedure 300 that explains the operation of the information-determining functionality 100 of FIG. 1 in flowchart form. In block 302, the information-determining functionality 100 computes bloom filter information $B_i$ for entity i. In block 304, the information-determining functionality 100 computes exception information $F_i$ associated with the bloom filter information $B_i$. The exception information $F_i$ identifies false positives that are generated by the bloom filter information $B_i$ for a known and bounded set of queries that may be posed to the bloom filter information $B_i$. In block 306, the calculated bloom filter information $B_i$ and the exception information $F_i$ are optionally forwarded to any kind of target destination, such as a presence server computer (as will be discussed in Section B), etc.

The right portion of FIG. 3 expands on the operations in block 304, in which the information-determining functionality 100 determines the false positives generated by the bloom filter information $B_i$. In block 308, the information-determining functionality 100 poses a query to the bloom filter information $B_i$, asking the bloom filter information $B_i$ whether a particular candidate item $x_c$ is member of the set S that the bloom filter information $B_i$ represents. In block 310, if the bloom filter information $B_i$ returns a negative result (i.e., that the item $x_c$ is not a member of the set), this result is deemed correct without the need to perform further processing. However, if the bloom filter information $B_i$ returns a positive result (i.e., that the item $x_c$ is a member of the set), then processing proceeds to block 312. In block 312, it is determined, by making reference to the original set S, whether $x_c$ is actually a member of the set S. In block 314, if the result of block 312 is negative (indicating that $x_c$ is not a member of the set S), then $x_c$ is added to the exception information $F_i$ for the bloom filter information $B_i$. This operation in block 304 is repeated for each candidate item $x_c$ in the set of candidate items that can be posed as queries to the bloom filter information $B_i$.

Figure 4:
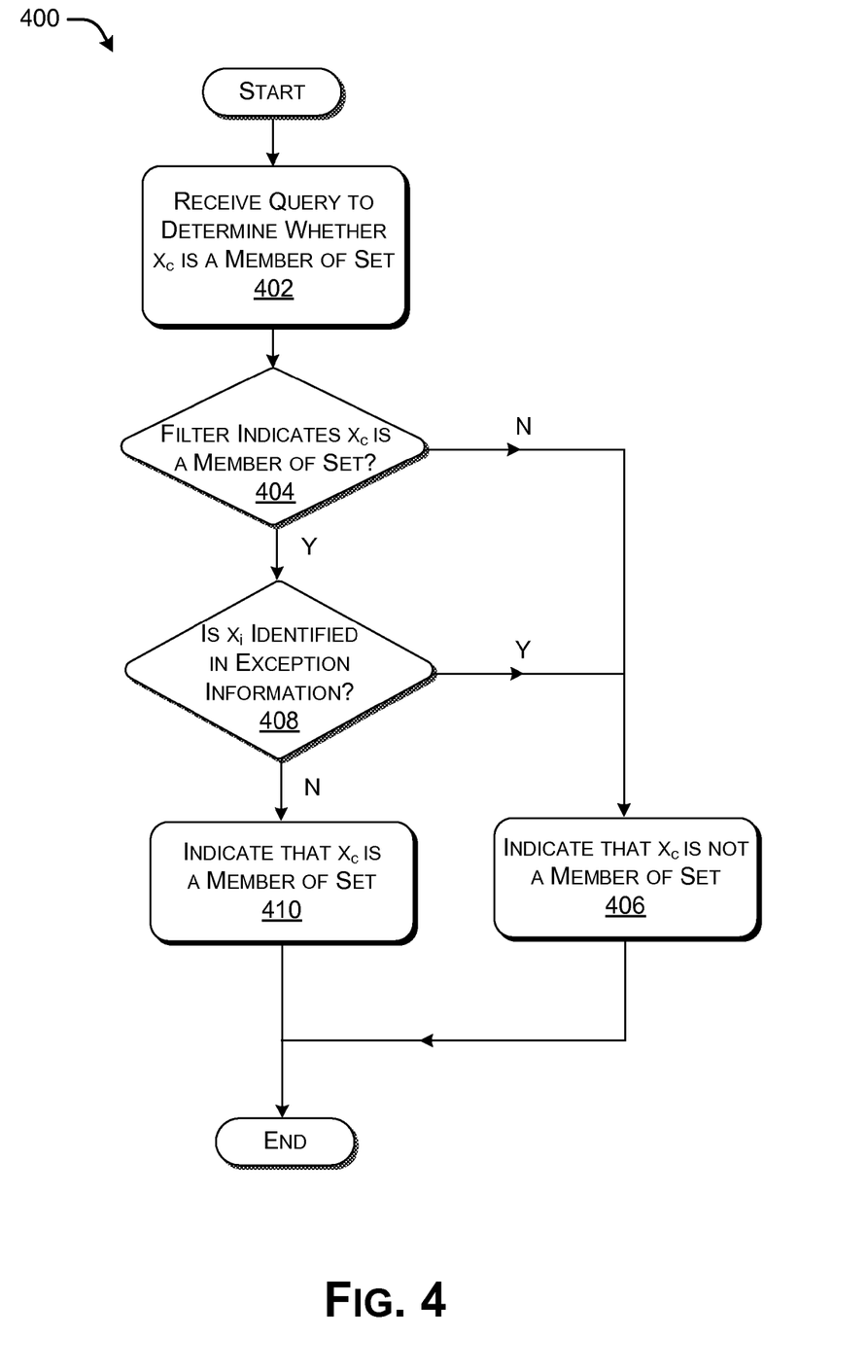
FIG. 4 is a flowchart which illustrates one manner of operation of the lookup functionality of FIG. 2.

FIG. 4 shows a procedure 400 that explains the operation of the lookup functionality 200 of FIG. 2 in flowchart form. In block 402, the lookup functionality 200 receives a query that asks the bloom filter information $B_i$ whether a particular candidate item $x_c$ is a member of the set S of items that the bloom filter information $B_i$ represents. In block 404, the bloom filter information $B_i$ returns either a negative or positive answer, e.g., indicating that the candidate item $x_c$ is not a member of the set or is a member of the set. If the answer is negative, then, in block 406, the lookup functionality 200 concludes that the candidate $x_c$ is not in the set, without the need for further processing. However, if the answer is positive, then, in block 408, the functionality 200 consults the exception information $F_i$. If the answer is positive (i.e., that the candidate item $x_c$ is in the exception information $F_i$), then, in block 406, the functionality 200 concludes that the candidate $x_c$ is not in the set S. If the answer is negative (i.e., that the candidate item $x_c$ is not in the exception information $F_i$), then, in block 410, the functionality 200 concludes that the candidate item $x_c$ is actually in the set S.

B. Illustrative Application of the Bloom Filter Information and Exception Information There are many different applications of the functionality (100, 200) described in Section A. This section sets forth one application of the functionality (100, 200). In this application, the functionality (100, 200) is used to coordinate interaction between a first group of devices of a first kind and a second group of devices of a second kind. In one example, the devices of the first kind can represent devices that adopt a current version of a system, while the devices of the second kind can represent devices that adopt a prior version of the system. The current version may introduce one or more features that are lacking in the prior version of the system.

More specifically, consider a communication system that allows devices to communicate with each other. For example, the communication system can allow the user to communicate with each other using an instant messaging (IM) paradigm. In this paradigm, a user who has a presence on a device (meaning that the user is logged onto the device) can communicate text and other information in a substantially real-time manner with another user who has a presence on another device.

A current version of the system may allow a user to maintain a simultaneous presence on multiple devices. For example, a user can be simultaneously logged onto a work computer and a home computer. In this version, any message that is sent or received by the user appears on both the work computer and home computer. Devices that are configured to interact with the current version of the system are referred to as multiple-point-of-presence-aware (MPOP-aware) devices.

A prior version of the system may not allow a user to be simultaneously logged onto multiple devices. For example, assume that a user is currently logged onto her work computer, and, without logging off of this computer, next tries to log onto her home computer. In the prior version of the system, this action may cause the user to be logged off of her work computer, or the user may be prevented from logging onto her home computer. Devices that are configured to interact with the prior version of the system are referred to as non-MPOP devices, meaning that the MPOP capability is not provided for these types of devices. These devices may also be referred to as "legacy" devices because they adopt a prior communication paradigm.

In this illustrative environment, the system can use the above-described bloom filter information and the exception information to help non-MPOP devices to communicate with MPOP-aware devices. More specifically, the bloom filter information and the exception information can allow non-MPOP devices to share content with MPOP-aware devices.

Figure 5:
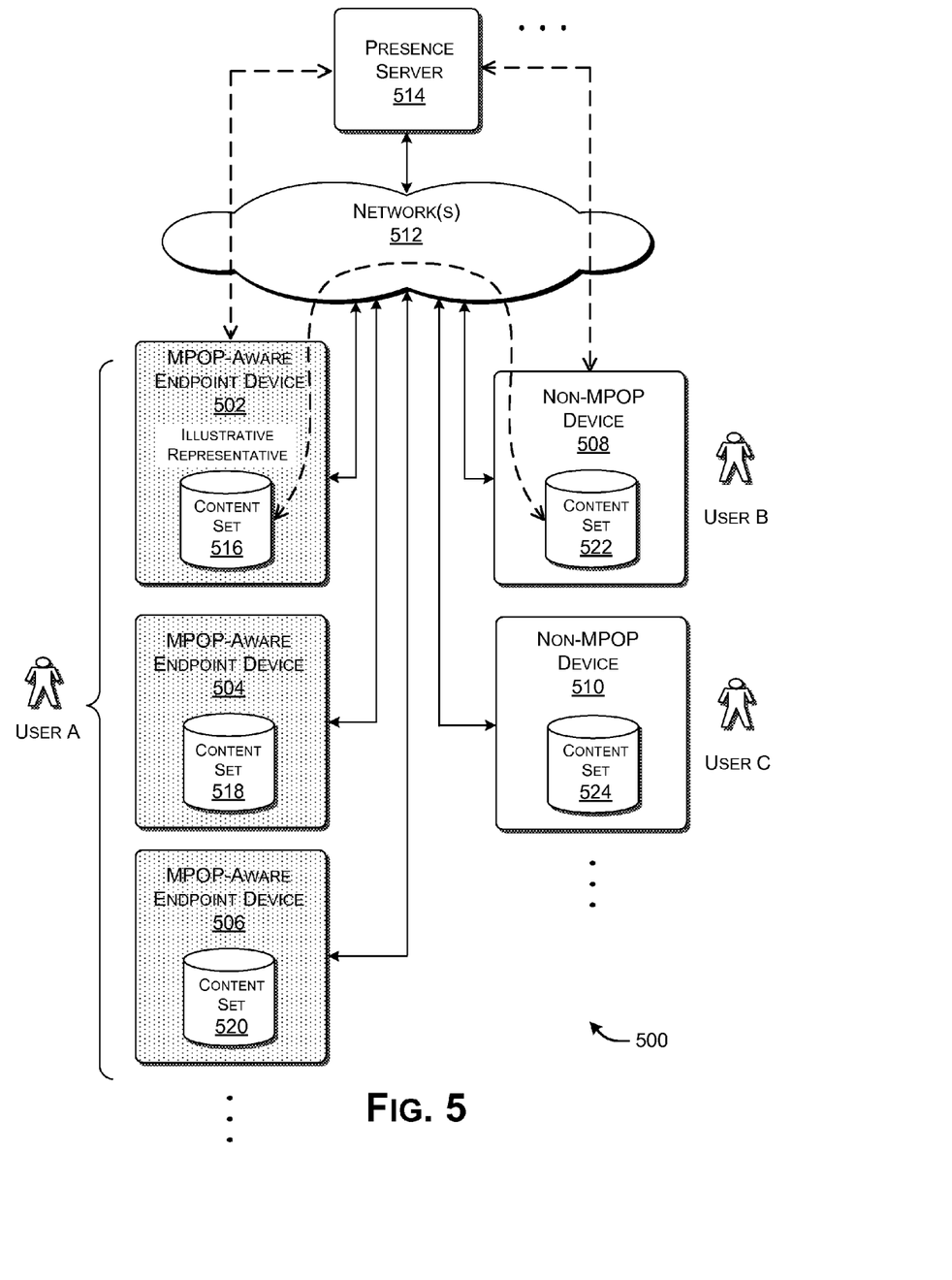
FIG. 5 shows a system that includes a first group of multiple-point-of-presence-aware (MPOP-aware) devices and a second group of non-MPOP devices, where the system uses the functionality of FIGS. 1 and 2 to coordinate interaction between the MPOP-aware devices and the non-MPOP devices.

With the above introduction, FIG. 5 shows a system 500 that represents one implementation of the above-described multi-versioned environment. Namely, this system 500 includes a first group of MPOP-aware devices (502, 504, and 506) and a second group of non-MPOP devices (508, 510). The MPOP-aware devices (502, 504, 506) allow a user (e.g., user A) to maintain simultaneous presence on the devices (502, 504, 506), meaning that the user can be logged onto any number of these devices (502, 504, 506) at the same time. Messages sent or received by any of these devices (502, 504, 506) are fanned out to other devices in this group (assuming that the user has presence on these devices at the time). In contrast, the non-MPOP devices (508, 510) allow a user to maintain only a single point of presence on one device. In this example, a user B is operating non-MPOP device 508, while a user C is operating non-MPOP device 510. User B cannot log onto another device without being logged off of device 508; similarly, user C cannot log onto another device without being logged off of device 510. FIG. 5 shows only five illustrative devices (502, 504, 506, 508, 510) to facilitate discussion, but it will be appreciated that the system 500 can accommodate a potentially great number of devices (e.g., hundreds of devices, thousands of devices, millions of devices, etc.). A device shown in FIG. 1 may represent any kind of processing component, such as a personal computer, a laptop computer, a personal digital assistant (PDA), a mobile telephone device, a game console, a set-top box associated with a television set, and so on.

The system 500 also includes a network 512 (which may represent one or more component networks). The network 512 can represent a local area network (LAN), a wide area network (WAN) (e.g., the Internet), or some combination of LAN(s) and WAN(s). The network 512 can be implemented by any combination of wireless links, hardwired links, routers, gateways, name servers, and so forth, and can be governed by any protocol or combination of protocols.

The system 500 also includes a presence server 514. The presence server 514 represents any processing functionality which receives presence information from devices and alerts other devices to such received presence information. For instance, the presence server 514 can receive a presence document from a device when a user logs onto that device, or in response to some other event that affects the status of user's session at that device. The presence server 514 can then communicate this presence document to other users with which the user has an affiliation. To provide one concrete example, in an IM paradigm, a user may log onto his personal computer, which prompts the user's device to send a presence document to the presence server 514. The presence server 514 forwards this presence document to the user's "buddies" (or, more generally stated, the user's "associates" or "contacts"). The presence document has the effect of alerting the user's contacts of the user's presence in the system 500. The presence document can be expressed in any type of format. In one illustrative case, the presence document can be expressed in the eXtensible Markup Language (XML) format.

More specifically, the presence server 514 can receive and disseminate both a public presence document and a private presence document. The presence server 514 sends the public presence document to the user's contacts and MPOP-aware devices. In the manner described above, the public presence document notifies the user's contacts that the user has a prescribed presence in the system 500. The presence server 514 sends the private presence document to all of the user's MPOP-aware devices that currently have presence in the system 500. For example, suppose that user A is currently interacting with MPOP-aware device 502, but is also logged onto MPOP-aware device 504 and device 506. The presence server 514 can disseminate a private presence document that identifies events occurring at MPOP-aware device 502 to MPOP-aware device 504 and device 506. Through this mechanism, each of the MPOP-aware devices operated by user A has full visibility into what is happening with other MPOP-aware devices operated by user A. The MPOP-aware devices (502, 504, 506) operated by user A are also referred to as "endpoint devices" herein. Unique identifiers, such as GUIDs, can be used to identify endpoints.

The presence server 514 can be implemented using any kind of processing functionality, such as one or more server-type computers. Further, FIG. 5 shows the use of only one presence server 514; but the system 500 can make use of plural presence servers that may be used by respective sets of devices.

According to one feature of the system 500, a user can set up a content-sharing relationship with any other user. More specifically, each of the devices can maintain a content store. For example: device 502 includes content store 516; device 504 includes content store 518; device 506 includes content store 520; device 508 includes content store 522; and device 510 includes content store 524. A user can set up a sharing relationship with another user such that information placed in the user's content store can be made available and sent to the other user. For example, in FIG. 5, the user A has configured her MPOP-aware device 502 so that it maintains a content-sharing relationship with user B who operates non-MPOP device 508. User A can place any kind of content in the store 516 of device 502. The content-sharing relationship that is established will cause the information in that store 516 to be transferred to the device 508 operated by user B. Likewise, if so configured, user B can place information in the store 522 of device 508, which will cause the information to be transferred to the device 502 operated by user A. In other words, the system 500 generally operates to synchronize the stores of devices which have established a content-sharing relationship.

The collection of information placed by a user in a store is referred to as a content set. The content set can include text information, image information, audio information, video information, executable code information, and/or any other kind of information or combination thereof. To name one scenario, a user may place a text document in her content set to make it readily available to a friend with whom she communicates frequently using the IM paradigm.

According to one illustrative content-sharing technique, a first device can send content to another device in direct peer-to-peer (P2P) fashion. In this case, the information is not routed through a centralized routing infrastructure.

Now consider the scenario in which user B, who operates non-MPOP device 508, has a content-sharing relationship with MPOP-aware device 502 operated by user A. Further assume that another MPOP-aware device operated by user A, such as MPOP-aware device 506, also has a sharing relationship with user B. A complexity arises in this scenario. The non-MPOP device 508 is operating under the prior version of the system 500, in which a user can only maintain a single presence on a machine at any given time. Based on its "understanding" of the system, the non-MPOP device 508 expects to be sharing content with only one device operated by user A, not multiple endpoints associated with user A. Stated in another way, the non-MPOP device 508 expects to share content with a single GUID, not several GUIDs.

To address this complexity, the system 500 appoints a representative MPOP-aware device to interact with the non-MPOP device 508. In this manner, the non-MPOP device 508 is "fooled" into thinking that it is only communicating with user A who has only one point of presence in the system 500. But, in fact, the user A may have multiple points of presence by being logged onto both MPOP-aware device 502 and MPOP-aware device 506, both of which have a sharing relationship established with user B who operates non-MPOP device 508. Assume that MPOP-aware device 502 has been selected as representative at a particular point in time, as identified by the label "illustrative representative" in FIG. 5. This device 502 receives information from non-MPOP device 508, and then fans this information out to the MPOP-aware device 506. In this manner, all of the MPOP-aware devices that have presence and have a content-sharing relationship with a common user will receive the same content.

To implement the above approach, the presence server 514 maintains records which indicate the topology of system 500. That is, the presence server 514 maintains records which indicate the different types of devices being operated in the system, e.g., whether the devices are MPOP-aware or non-MPOP. The presence server 514 also maintains records which indicate the sharing relationships established among devices in the system 500. To name one example, the presence server 514 can maintain a record which indicates that user A has a content-sharing relationship on MPOP-aware devices 502 and 506 with user B on non-MPOP device 508. The presence server 514 can also determine the representative MPOP-aware device that the non-MPOP device 508 should use when communicating with the MPOP-aware devices (502, 506).

As indicated above, the system 500 can include many more devices than the representative five devices that are shown, and devices can maintain relatively complex contact relationships and sharing relationships with other devices. As a consequence, the records maintained by the presence server 514 can grow to be relatively large in size. To address this challenge, the presence server 514 can represent the sharing relationships in the system 500 using bloom filter information and exception information in the manner set forth below.

Figure 6:
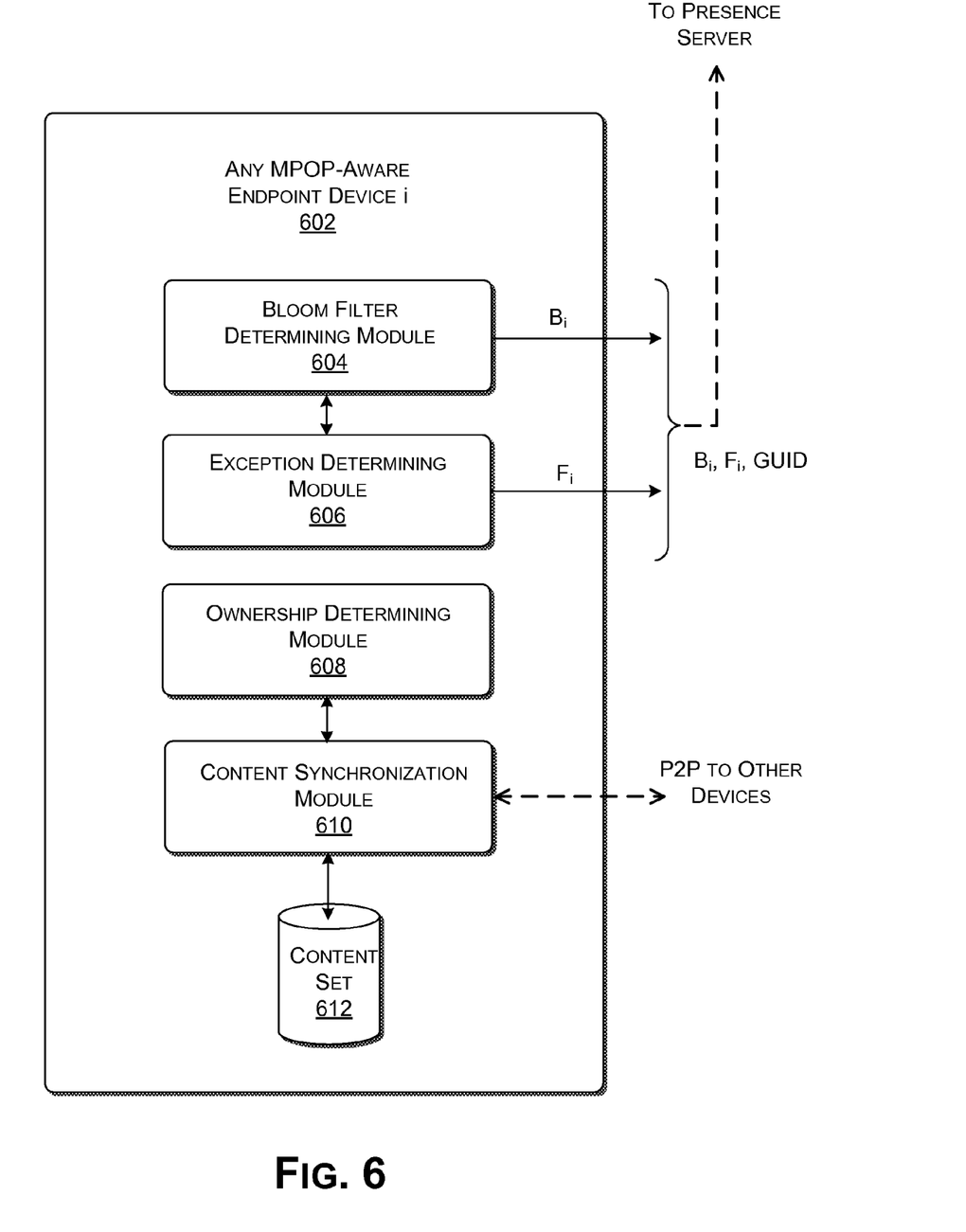
FIG. 6 shows an illustrative composition of an MPOP-aware device used in the system of FIG. 5.

Consider first the role of any MPOP-aware device in the system 500. FIG. 6 shows a representative MPOP-aware device 602. The MPOP-aware device 602 includes a bloom filter determining module 604 and an exception determining module 606. The bloom filter determining module 604 performs the same operation as described above in FIG. 1. That is, the bloom filter determining module 604 forms bloom filter information $B_i$ that represents a set of items S in compressed form. In this context, the members of the set of items represent the devices (e.g., "buddies" or contacts) with which the MPOP-aware device 602 has a sharing relationship. The devices in the set can be represented in any way, such as by any type of identification information associated with the respective devices. For example, the bloom filter determining module 604 can compute bloom filter information based on the following set:

$$C_i = \{id_1, id_2, \ldots id_n\}$$

where $C_i$ represents the set of sharing-relationships for the MPOP-aware device 602 (corresponding to endpoint i), and $id_1, id_2, \ldots, id_n$ represent the n devices with which the MPOP-aware device 602 has a sharing relationship.

The exception determining module 606 determines exception information $F_i$. The exception information $F_i$ identifies false positives that can be generated by the bloom filter information $B_i$. As discussed in Section A, a false positive happens when the bloom filter information $B_i$ indicates that a candidate item $x_c$ is a member of the set S, but the candidate item $x_c$ is not actually a member of the set. To compute the exception information $F_i$, the exception determining module 606 successively presents a bounded set of queries that may be posed to the bloom filter determining module 604. If the exception information $F_i$ incorrectly indicates that a candidate item $x_c$ is in the set, then the exception determination module 604 adds this candidate item $x_c$ to the exception information $F_i$.

In the present context, a candidate item $x_c$ in a possible query can correspond to any one of the id's in any of the $C_i$'s associated with a group of MPOP endpoints. That is, the id's that can be identified by the queries are defined by the set T:

$$T = \cup C_i$$

An MPOP-aware device is able to compute the exception information $F_i$ in part because it has full visibility as to the topology of its other endpoint devices, including the sharing relationships maintained by its other endpoint devices. The MPOP-aware device can glean this knowledge using various mechanisms. In one illustrative technique, topology information can be shared by devices using peer-to-peer (P2P) communication. In another technique, topology information can be shared via private presence documents, and so on.

The MPOP-aware device 602 is operative to send the bloom filter information $B_i$ and the exception information $F_i$ to the presence server 514, along with its GUID. In one case, the MPOP-aware device 602 computes and forwards $B_i$ and $F_i$ when the user logs onto the device 602, when the sharing relationship associated with the MPOP-aware device 602 changes, and/or in response to any other event that can affect the membership of the set of items associated with this device 602.

The system 500 can select the various parameters used by the bloom filter determining module 604 to achieve various goals. In one non-limiting case, the goal may be to use a minimum space for storage of the bloom filter information while also keeping the amount of hash functions computed on the presence server 514 to a minimum, while still enjoying a low false positive rate. It is desirable to keep the false positive rate relatively low because the penalty for a false positive is high (in terms of the amount of information used to express and convey a false positive).

Different environments may select and use different values for the parameters. As a general observation, the level of compression achieved can be significant. For instance, in one illustrative and non-limiting case, the value of m can be relatively small, e.g., it can be smaller than 20. To repeat, different levels of compression may be appropriate for different environments.

The MPOP-aware device 602 also includes an ownership determining module 608. The purpose of the ownership determining module 608 is to determine what endpoint device should serve as a representative when sharing content with a non-MPOP device. If the MPOP-aware device 602 determines that it has been chosen as the representative, then it henceforth acts as the representative. Otherwise, the MPOP-aware device 602 does not act as the representative; instead, it relies on another device which has been chosen as the representative to interact with the non-MPOP device. The presence server 514 determines a representative MPOP-aware device in a parallel manner to the ownership determination operations performed by each MPOP-aware device. The details of this operation will be explained below when discussing the functionality of the presence server 514.

The MPOP-aware endpoint device 602 also includes a content synchronization module 610. The purpose of this module 610 is to transfer information stored in a content store 612 with one or more other devices with which the device 602 has a sharing relationship. The content synchronization module 610 can also receive content from other devices.

The MPOP-aware endpoint device 602 may include other modules that are not germane to the sharing of content in a multi-versioned system, and hence are not illustrated or described herein.

Figure 7:
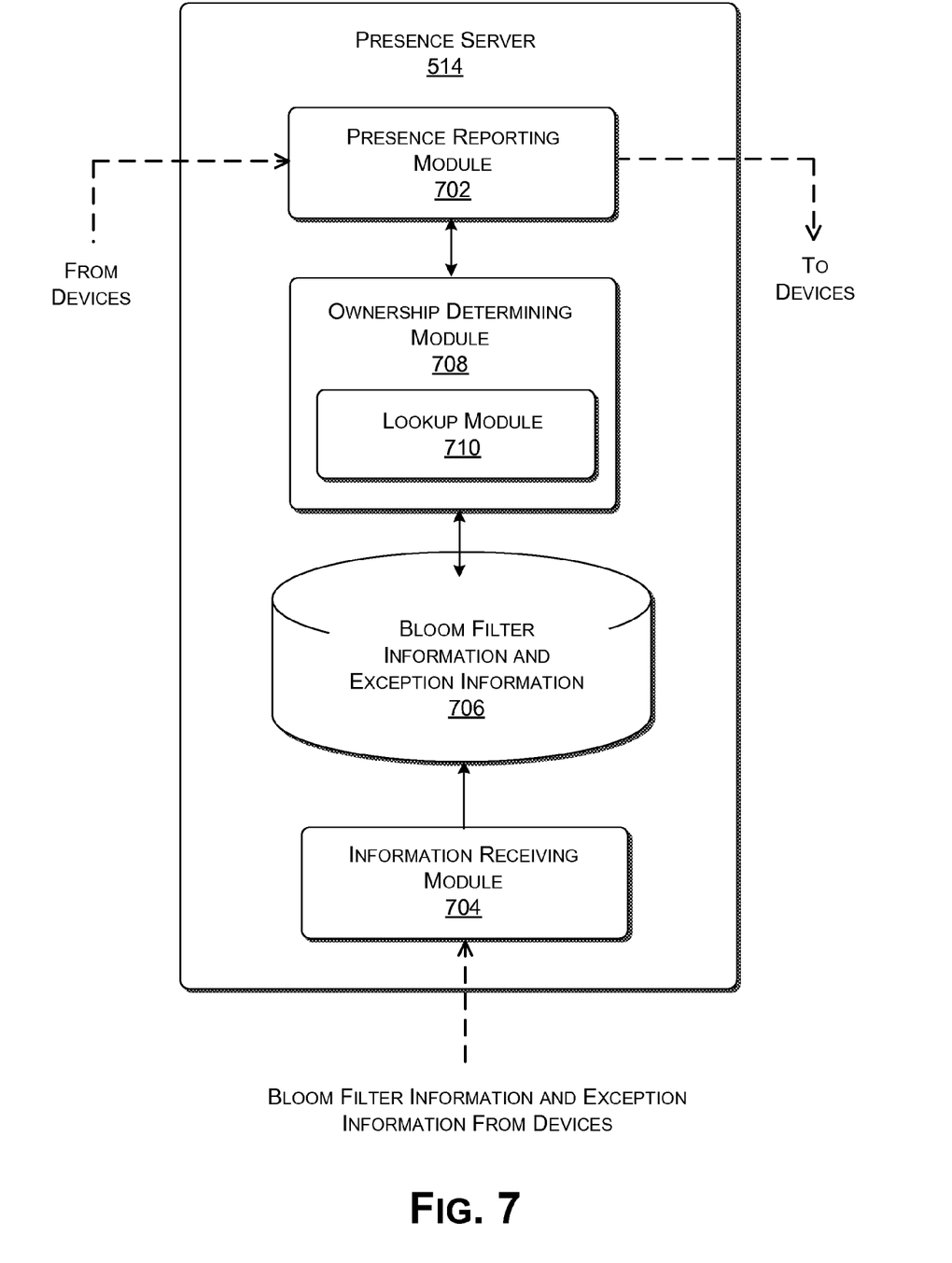
FIG. 7 shows an illustrative composition of a presence server used in the system of FIG. 5.

Consider next the role of presence server 514 in the system 500. FIG. 7 shows an illustrative composition of the presence server 514. The presence server 514 includes a presence reporting module 702. The purpose of the presence-reporting module 702 is to receive an indication of user presence in the system 500 and to report such presence to other associated users in the system 500. The presence reporting module 702 can also notify a non-MPOP device of the representative MPOP-aware device that it should use when sharing content with a user who has multiple points of presence.

The presence server 514 also includes an information receiving module 704. The purpose of the information receiving module 704 is to receive bloom filter information $B_i$ and exception information $F_i$ from various MPOP-aware devices (note that non-MPOP devices do not compute $B_i$ and $F_i$ information). As described above, the MPOP-aware devices compute the $B_i$ and $F_i$ information when the users log onto the MPOP-aware devices, when the content-sharing relationships of these devices change, and/or in response to other events. The information receiving module 704 stores the $B_i$ and $F_i$ information from the plurality of MPOP-aware devices in a presence server store 706. The $B_i$ information is compressed, which reduces the size of the set information maintained in the store 706.

The presence server 514 also includes an ownership determining module 708. The purpose of the ownership determining module 708 is to determine a representative that can be used by a non-MPOP device when sharing content with a user who may be logged onto multiple MPOP-aware devices. Different algorithms can be used to select a representative MPOP-aware device. In one case, each MPOP-aware device has a unique identifier, such as a GUID. The ownership determining module 708 can select the MPOP-aware device (that has presence) that has the highest unique identifier number as the representative.

For example, the following pseudo-code algorithm can be used to select a representative:

```
for each index i in endpoint IDs
    if ENHANCED_LOOKUP(BFs[i], x_c) then
        owner is i
    endif
end
```

The algorithm operates by successively determining whether a candidate item $x_c$ (corresponding to one of the id's in the above-defined set T) is a member of $BF_i$, where $BF_i$ is associated with an MPOP-aware endpoint i. The ownership determining module 708 relies on a lookup module 710 to perform the ENHANCED_LOOKUP function in the above algorithm, which corresponds to procedure set forth above in FIG. 4. If the candidate item $x_c$ is a member of plural $BF_i$'s, then this algorithm has the effect of selecting the last $BF_i$, which corresponds to the MPOP-aware endpoint device with the highest identification number. This highest-number MPOP-aware device serves as the representative for communicating with a non-MPOP device associated with candidate item $x_c$. Upon determining a representative MPOP-aware device, the presence reporting module 702 can convey this selection to the $x_c$ device.

As stated above, each MPOP-aware device performs the same ownership determination operation described above in parallel with the presence server 514. Thus, there should be agreement between the presence server 514 and the MPOP-aware devices regarding which MPOP-aware device is to act as a representative.

Figure 8:
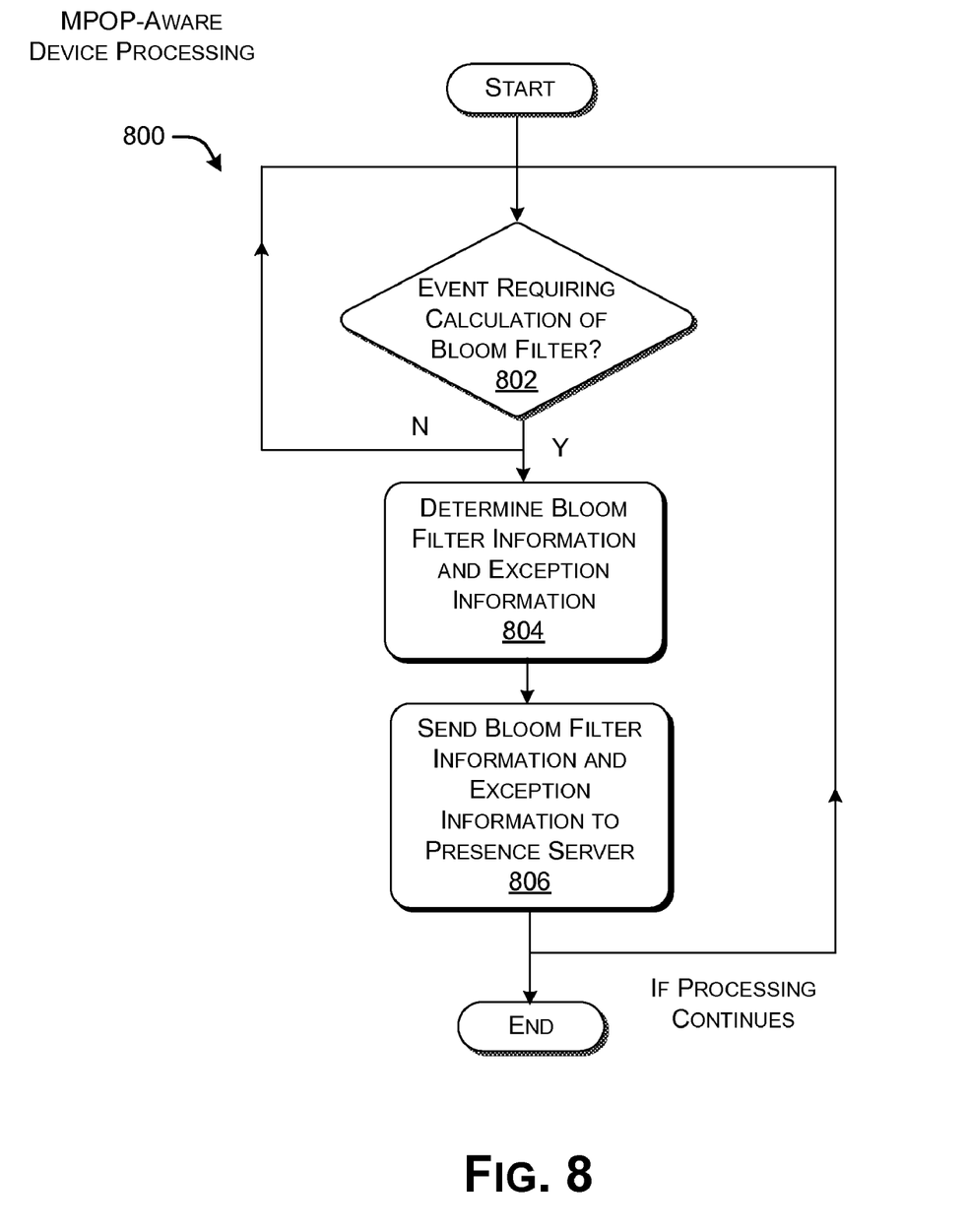
FIG. 8 is a flowchart which illustrates one way in which an MPOP-aware device can determine and convey bloom filter information and exception information.

The remaining figures in this section summarize the above-described operations performed by the system 500 in flowchart form. To begin with, FIG. 8 is a flowchart which shows a procedure 800 used by any MPOP-aware device to compute and forward bloom filter information $B_i$ and exception information $F_i$. In block 802, the MPOP-aware device determines whether an event has occurred which requires the calculation of $B_i$ and $F_i$. One such event is when the user logs onto the device. Another such event is when the content-sharing relationship affecting the device changes, and so on. In block 804, the MPOP-aware device determines the bloom filter information $B_i$ and the exception information $F_i$ using the same procedure set forth in FIG. 3. In this case, the members of the set of items correspond to devices with which the MPOP-aware device i has a sharing relationship. In block 806, the MPOP-aware device sends the $B_i$ and $F_i$ information to the presence server 514, along with the GUID of the MPOP-aware device.

Figure 9:
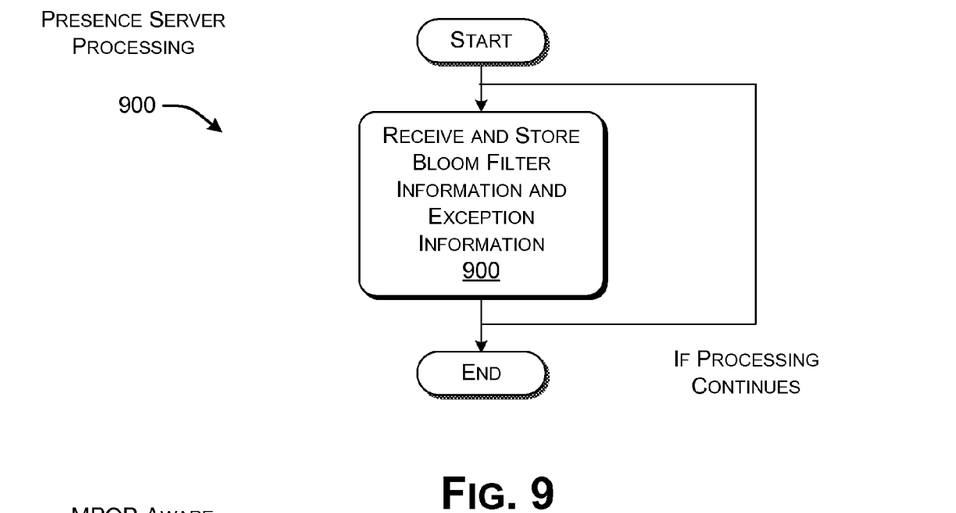
FIG. 9 is a flowchart which illustrates the receipt of bloom filter information and exception information at a presence server.

FIG. 9 is a flowchart which shows a procedure 900 used by the presence server 514 to receive bloom filter information $B_i$ and exception information $F_i$. The procedure 900 comprises a sole block 902 which entails receiving and storing the $B_i$ and $F_i$ information.

Figure 10:
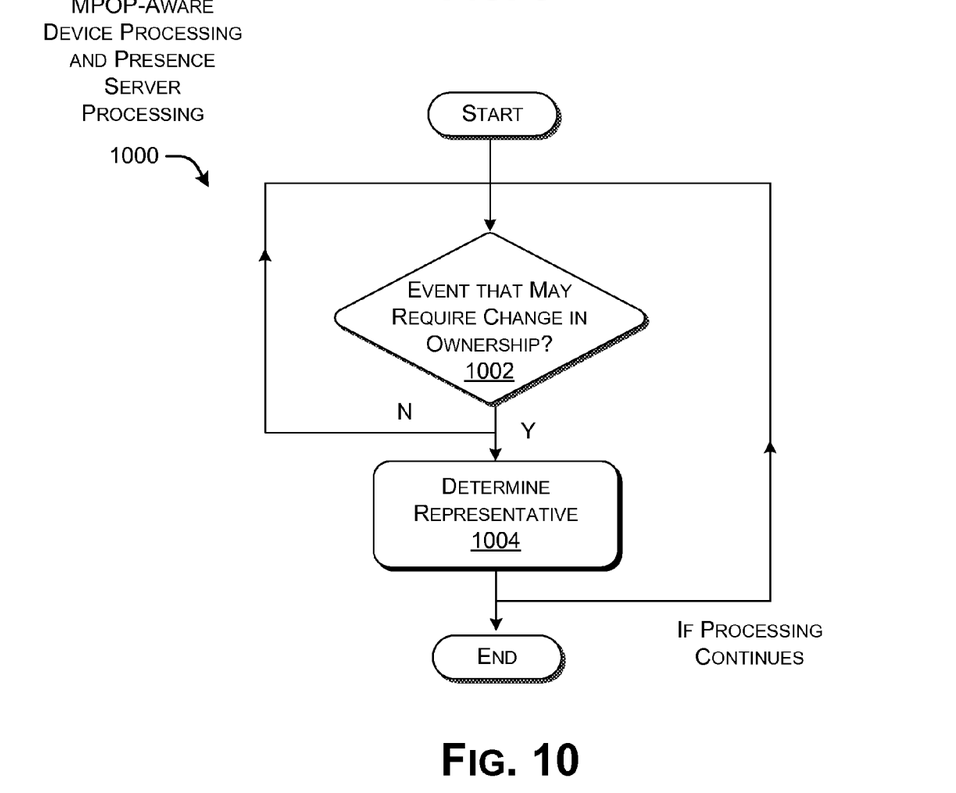
FIG. 10 is a flowchart which illustrates one way in which any MPOP-aware device and the presence server can determine a representative MPOP-aware device.

FIG. 10 is a flowchart which shows a procedure 1000 that is used by both each MPOP-aware device and the presence server 514 to compute a representative MPOP device. In block 1002, the MPOP-aware device and the server 514 determine whether an event has occurred that requires determining a representative MPOP-aware device. Such an event can correspond to a user logging onto a device, a change in a content-sharing relationship, and so forth. In operation 1004, the MPOP-aware device and the server 514 determine a representative MPOP-aware device in the manner described above.

In conclusion, it should be noted that the system 500 represents only one non-limiting application of the bloom filter information $B_i$ and the exception information $F_i$.

C. Illustrative Processing Functionality

Figure 11:
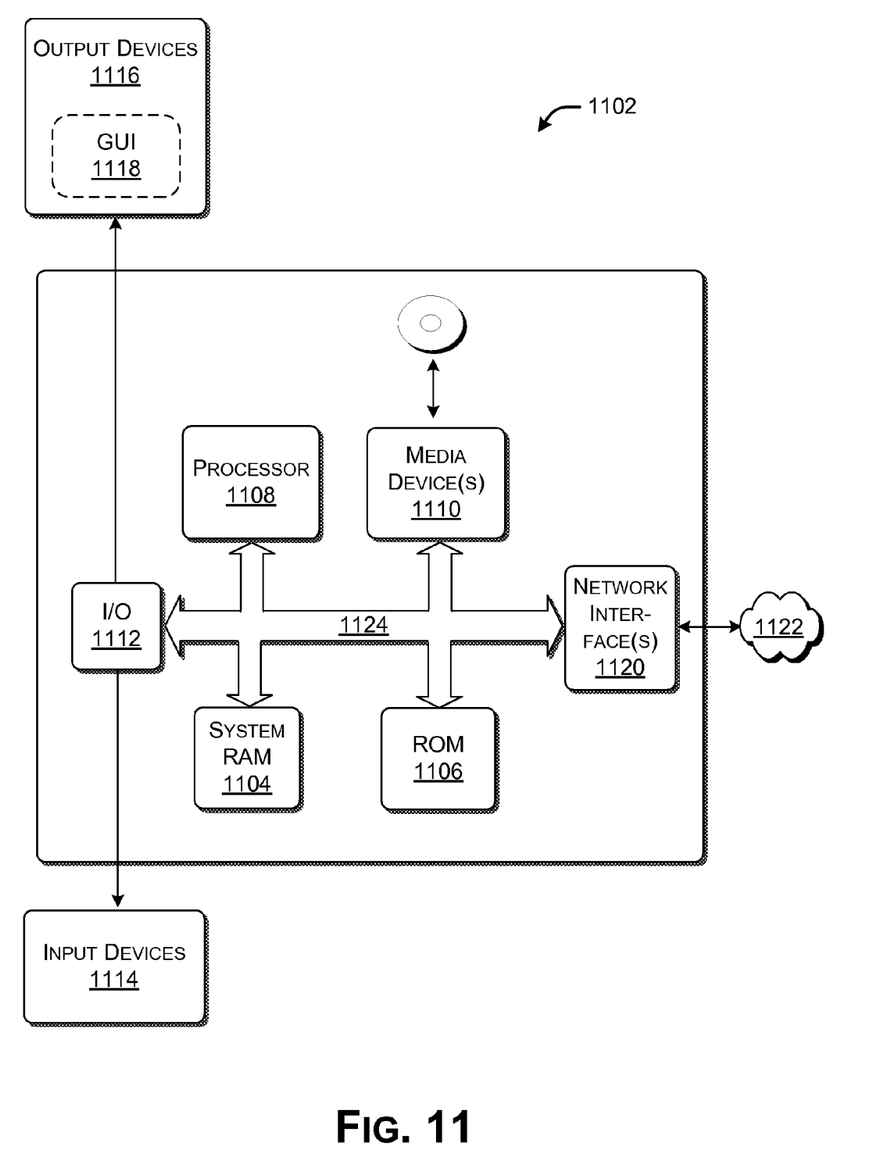
FIG. 11 shows illustrative processing functionality that can be used to implement any aspect of the system of FIG. 5.

FIG. 11 sets forth exemplary processing functionality 1102 that can be used to implement any aspect of system 500 shown in FIG. 5. In one non-limiting case, for instance, the processing functionality 1102 may represent any computer machine used by the system 500, e.g., to implement any aspect of any user device, any aspect of the presence server 514, and so on.

The processing functionality 1102 can include various volatile and non-volatile memory, such as RAM 1104 and ROM 1106, as well as one or more central processing units (CPUs) 1108. The processing functionality 1102 can perform various operations identified above when the CPU 1108 executes instructions that are maintained by memory (e.g., 1104, 1106, or elsewhere). The processing functionality 1102 also optionally includes various media devices 1110, such as a hard disk module, an optical disk module, and so forth.

The processing functionality 1102 also includes an input/output module 1112 for receiving various inputs from the user (via input devices 1114), and for providing various outputs to the user (via output devices 1116). One particular output device may include a display apparatus and an associated graphical user interface (GUI) 1118. The processing functionality 1102 can also include one or more network interfaces 1120 for exchanging data with other devices via one or more communication conduits 1122. One or more communication buses 1124 communicatively couple the above-described components together.

The communication conduits 1122 can be implemented in different ways to suit different technical and commercial environments. For instance, the communication conduits 1122 can include any kind of network (or combination of networks), such as a wide area network (e.g., the Internet), an intranet, Digital Subscriber Line (DSL) network infrastructure, point-to-point coupling infrastructure, and so on. In the case where one or more digital networks are used to exchange information, the communication conduits 1122 can include various hardwired and/or wireless links, routers, gateways, name servers, and so on. The communication conduits 1122 can be governed by any protocol or combination of protocols. (In the context of FIG. 5, the communication conduits 1122 may represent the network 512.)

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A machine-readable storage device storing device-executable instructions that, when executed, cause one or more processors to perform operations, comprising:

determining bloom filter information based on a set of items, the set of items representing one or more devices, the one or more devices represented by a respective identification number or code;

determining exception information that identifies false positives associated with the bloom filter information;

identifying multiple-points-of-presence-aware (MPOP-aware) devices that adopt a current version of a communication system, the current version of the communication system enabling a first user to maintain a simultaneous presence on more than one MPOP-aware device;

identifying non-multiple-points-of-presence (non-MPOP) devices that adopt a prior version of the communication system, the prior version of the communication system enabling a second user to maintain a single presence on a particular device at a particular time, the communication system enabling the non-MPOP devices and the MPOP-aware devices to communicate with each other; and identifying, based at least partially on the bloom filter information and the exception information, a first representative device of the MPOP-aware devices to interact with a second representative device of the non-MPOP devices.

2. The machine-readable storage device of claim 1, wherein the determining of the exception information that identifies false positives comprises:

identifying a set of queries that are presented to a bloom filter, each query asking the bloom filter whether a candidate item is in the set of items;

determining whether the bloom filter information indicates that the candidate item is a member of the set of items;

determining, when the bloom filter information indicates that the candidate item is a member of the set of items, whether the candidate item is actually a member of the set of items; and when the candidate item is not actually a member of the set of items, storing the candidate item as a member of the exception information, wherein the determining of the false positives is repeated for a collection of candidate items associated with respective identified queries that are presented to the bloom filter.

3. The machine-readable storage device of claim 1, wherein after determination of the bloom filter information and exception information, further comprising:

identifying a bound set of queries associated with a candidate item for presentation to the bloom filter to determine whether the candidate item is a member of the set of items;

determining, when the bloom filter information indicates that the candidate item is a member of the set of items, whether the candidate item is included within the exception information; and identifying, when the candidate item is not a member of the exception information, the candidate item as actually being a member of the set of items.

4. The machine-readable storage device of claim 1, wherein the bloom filter information is associated with a first device, and wherein the set of items corresponds to one or more other devices with which the first device has a content-sharing relationship.

5. The machine-readable storage device of claim 1, wherein a user can maintain a simultaneous presence on two or more of the MPOP-aware devices, and wherein the user can maintain a single presence on one of the non-MPOP devices.

6. The machine-readable storage device of claim 1, wherein the non-MPOP device uses the representative MPOP-aware device to share content with said one or more members of the first group of MPOP-aware devices.

7. The machine-readable storage device of claim 1, wherein a presence server determines the representative MPOP-aware device, further comprising sending a message to the non-MPOP device to notify the non-MPOP device of an identity of the representative MPOP-aware device.

8. The machine-readable storage device of claim 1, wherein each of said one or more members of the first group of MPOP-aware devices determine the representative MPOP-aware device, wherein only the representative MPOP-aware device interacts with the non-MPOP device.

9. A computerized method for managing a set of items, comprising:

identifying a first group of devices comprising multiple-points-of-presence-aware (MPOP-aware) devices, the first group of devices adopting a current version of a communication system, the current version of the communication system enabling a first user to maintain a simultaneous presence on more than one MPOP-aware device;

identifying a second group of devices comprising non-multiple-points-of-presence (non-MPOP) devices, the prior version of the communication system enabling a second user to maintain a single presence on a particular device at a particular time, the second group of devices adopting a prior version of the communication system, the communication system enabling the first group of devices and the second group of devices to communicate with each other;

receiving a query presented to a bloom filter to determine whether a candidate device has a membership in the first group of devices, the bloom filter providing bloom filter information that is associated with the first group of devices, each of the first group of devices having a content-sharing relationship with other devices in the first group of devices that enables a message sent or received by a particular device in the first group of devices to appear on the other devices in the first group of devices at the same time;

determining whether the candidate device is included within exception information that identifies false positives associated with the bloom filter information when the bloom filter information indicates that the candidate device is a member of the first group of devices; and identifying the candidate device as having the membership in the first group when the candidate device is not a member of the exception information.

10. One or more computing devices, comprising:
one or more processors; and
memory to store computer-executable instructions that, when executed by the one or more processors, perform the computerized method of claim 9.

11. A system, comprising:

a first group of multiple-point-of-presence-aware (MPOP-aware) devices that adopt a current version of the system, the current version of the system enabling each one of the non-MPOP devices configured to allow a respective user to maintain a simultaneous logged in presence on two or more of the MPOP-aware devices, such that a message sent or received appears on the two or more of the MPOP-aware devices at the same time;

a second group of non-MPOP devices that adopt a previous version of the system, the previous version of the system enabling each one of the non-MPOP devices configured to allow a user to maintain only a single presence on one of the non-MPOP devices; and a presence server for communicating the presence of users on devices within the system, the presence server configured to:

notify a respective non-MPOP device of an MPOP-aware device that will serve as a representative MPOP-aware device of one or more members of the first group of MPOP-aware devices; and determine the representative MPOP-aware device by using bloom filter information and exception information that identifies false positives associated with the bloom filter information.

12. The system of claim 11, wherein the non-MPOP device is configured to use the representative MPOP-aware device to share content with said one or more members of the first group of MPOP-aware devices.

13. The system of claim 11, wherein each of said one or more members of the first group of MPOP-aware devices is also configured to determine the representative MPOP-aware device, wherein only the representative MPOP-aware device interacts with the non-MPOP device.

14. The system of claim 13, wherein each of said one or more members of the first group of MPOP-aware devices is configured to determine the representative MPOP-aware device by using bloom filter information and exception information.

* * * * *